(No Model.)

F. M. SHATTUC.
RAILWAY TICKET.

No. 513,538. Patented Jan. 30, 1894.

UNITED STATES PATENT OFFICE.

FRED MILLIMAN SHATTUC, OF CINCINNATI, OHIO.

RAILWAY-TICKET.

SPECIFICATION forming part of Letters Patent No. 513,538, dated January 30, 1894.

Application filed November 25, 1892. Serial No. 453,011. (No specimens.)

*To all whom it may concern:*

Be it known that I, FRED MILLIMAN SHATTUC, a citizen of the United States, residing at Cincinnati, county of Hamilton, State of Ohio, have invented a certain new and useful Improvement in Railway-Tickets; and I declare the following to be a full, clear, and exact description of the invention, such as will enable others skilled in the art to which it appertains to make and use the same, reference being had to the accompanying drawings, which form a part of this specification.

My invention relates to certain new and useful improvements in railway tickets, and has for its object, more particularly, to provide a continuous passage ticket, so constructed and arranged as to prevent the liability of its being manipulated by scalpers.

To this end my invention consists of the ticket hereinafter described and claimed, and illustrated in the accompanying drawings, which show in Figures 1 and 2 a front view of my improved ticket, the ticket being shown severed to accommodate it to the size of the sheet.

As is well known, continuous trip tickets are frequently limited to a certain number of days within which the passenger is required to make the journey within the contract on which the ticket is issued. On account of the liability of missing connections at some point, as through some large city through which the passenger is to pass, it has been found generally necessary to allow a little over time, as for example, four days within which to make a trip which by the schedule requires only three days. This leaves a loop hole and a liability for scalpers to manipulate the ticket, because when the passenger arrives at a given point on time, which of course would ordinarily be the case, he can sell his ticket to a broker, and the broker has all day in which to dispose of the ticket. This liability it is the object of my invention to overcome, and still permit the public to procure limited tickets without the railway company being liable to be the loser thereby. There are many cases and circumstances when it is desirable and proper for the railways to make cheap rates between various points, as to conventions, and the like, but the railways in self preservation are compelled to protect themselves, as much as possible, againt the brokers scalping the intermediate business. Thus my improved ticket is intended to be of benefit both to the public and to the railways, since by its use the railways can make as low rates as they please from point to point without fear of having their intermediate business damaged thereby.

I carry out my invention as follows:

A represents my improved ticket, which is provided with a desired form of contract on a contract stub A'. An auditor's stub $A^2$ and agent's stub $A^3$ may also be employed.

My invention relates more particularly to the destination coupons attached to the contract stub. Accordingly B represents the stub or coupon to be first detached from the starting point. B' and $B^2$ denote additional destination coupons. Across the face of these coupons, except the contract stub I print in line a list of the calendar months with figures, whereby the proper date can be punched out, as shown at D. In addition thereto, I print, preferably, two rows of figures, as at D' one designating hours, and the other minutes, whereby the hour and minute can be punched out, of the day indicated under the day of the month, punched in the ticket. The provision for punching out the day of the month, the hour and the minute, I call the continuous passage feature of my improved ticket.

It will be seen that the coupons are provided, as shown, with the date, hour and minute marks on each, these marks upon each coupon being printed upon portions "*b*" and "*b'*" of each coupon adjacent one to the other, and in such order that when the portions "*b*" and "*b'*" are folded therebetween as at *a* the date marks, the hour marks and the minute marks will register, so that by folding two adjacent coupons between said portions, before the conductor severs his suitable coupon, he may thereby punch, in duplicate, the date, hour and moment of the arrival of his train at the destination covered by the coupon which he is to sever from the ticket. Thus his coupon, and the coupon for the next conductor to take up, both bear punched therein, the day, hour and moment of the passenger's arrival at the point covered by the first coupon.

The contract being for a continuous trip, it will, by its terms, be necessary for the passenger to take the next outgoing train on the line by which he is to travel farther upon his ticket. Should the former train have missed a connection, the passenger should take the first succeeding outgoing train on the line over which he is to travel.

In the use of a ticket provided with my continuous passage feature above described, when the second conductor comes to examine the tickets, he sees at once by the date, hour and minute mark of the passenger's arrival, whether he has taken the first train out, as called for under his contract. If the first train was late in arriving so as to miss the usual and expected connection, the second conductor is apprised of that fact, and can at once discover, on examining the passenger's ticket, whether or not he has taken the next succeeding train after his arrival according to contract. We will suppose, for example, that a passenger starts from Cincinnati for Denver, with a continuous ticket embodying my continuous passage features, allowing no stop over. The conductor of the train leaving Cincinnati before he detaches his proper coupon, folds the ticket between the portions "b" and "b'," and punches out the date, hour and moment at which his train arrives at St. Louis. The time of arrival is, we will say, 7.40 a. m., October 26. The conductor punches out October, and makes 26 by punching out a combination of figures adjacent to the months. He also punches out 7 in the hour line, and 40 in the minute line. These dates and figures are punched out in two adjacent coupons, thus, as above described. The schedule time for leaving St. Louis, we will say, is 8.30 a. m., of the same date over the Missouri Pacific train. The record made by the conductor from Cincinnati before detaching his coupon is duplicated thus on the next Missouri Pacific coupon, and in order for the latter coupon to be good, the passenger must present it on the train connecting with that arrived from Cincinnati. Should the Cincinnati train be late and miss connection with the 8.30 train over the Missouri Pacific, the Missouri Pacific coupon must be presented on the first train leaving St. Louis thereafter, and the latter conductor can tell at a glance whether the passenger is entitled to transportation or not, under the contract.

This ticket could not be manipulated by scalpers, and would not be purchased by any one other than a bona fide through passenger.

The additional coupons of the ticket, other than those above described would be provided with a like feature, so that the following conductors would all have successively the record of the arrival of the preceding train, and would thus be able to know whether the ticket was presented from a connecting train or not.

While it is obviously convenient to fold the ticket between two adjacent coupons, and to punch out the date, hour and minute marks in duplicate, this arrangement is not essential to my invention, as the conductor might accomplish the same result in repeated operations, or the ticket may make provision within the scope of my invention for a conductor to make such a record of the time of his arrival upon a succeeding coupon without making a duplicate record on his coupon, although the latter is desirable.

In the drawings, I have only shown coupons B, B', B², which will suffice to explain my invention. It will be understood that as many coupons may be thus constructed as may be required.

While I have shown an auditor's and an agent's stub, these form no part of my invention, and I do not limit myself thereto.

What I claim as my invention is—

A continuous railway ticket, provided with coupons, each provided at each end with date, hour and minute marks, whereby a conductor may register on the coupon for the following conductor, the time of the arrival of the passenger at a given destination point reached under the previous coupon, substantially as described.

In testimony whereof I sign this specification in the presence of two witnesses.

FRED MILLIMAN SHATTUC.

Witnesses:
GEO. F. WELLS,
C. S. MACKELFRESH.